US010612658B2

(12) United States Patent
Lee et al.

(10) Patent No.: US 10,612,658 B2
(45) Date of Patent: Apr. 7, 2020

(54) SHAPE MEMORY ALLOY MEMBER FOR USE IN POLYMER OR COMPOSITE SEAL APPLICATIONS

(71) Applicant: FMC Technologies, Inc., Houston, TX (US)

(72) Inventors: Kwok Lun Lee, Houston, TX (US); William Thomas, Houston, TX (US); David Zollo, Houston, TX (US); Gabriel Albor, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 16/306,729

(22) PCT Filed: Jun. 3, 2016

(86) PCT No.: PCT/US2016/035645
§ 371 (c)(1),
(2) Date: Dec. 3, 2018

(87) PCT Pub. No.: WO2017/209760
PCT Pub. Date: Dec. 7, 2017

(65) Prior Publication Data
US 2019/0338854 A1    Nov. 7, 2019

(51) Int. Cl.
*F16J 15/02* (2006.01)
*C22C 14/00* (2006.01)
*F16J 15/16* (2006.01)

(52) U.S. Cl.
CPC ............. *F16J 15/028* (2013.01); *C22C 14/00* (2013.01); *F16J 15/164* (2013.01)

(58) Field of Classification Search
None
See application file for complete search history.

(56) References Cited

U.S. PATENT DOCUMENTS 4,424,865 A   1/1984 Payton, Jr.
4,429,854 A   2/1984 Kar et al.
(Continued)

FOREIGN PATENT DOCUMENTS

JP    S5926668 A    2/1984
JP    S60168970 A   9/1985
(Continued)

OTHER PUBLICATIONS

Communication Pursuant to Article 94(3) EPC from corresponding European patent application No. 16734017.0 dated May 24, 2019.
(Continued)

*Primary Examiner* — Vishal A Patel
(74) *Attorney, Agent, or Firm* — Amerson Law Firm, PLLC

(57) ABSTRACT

A sealing system (100) that includes a first component (112), a second component (114) and a polymer seal (116) positioned in a seal recess (118) in the first component. A TWSMA member (122) is positioned in the seal recess (118), wherein the TWSMA member (122) has a retracted shape (122R) and an expanded shape (122E), the TWSMA member (122) transitioning from the retracted shape (122R) to the expanded shape (122E) at a temperature that is less than an installation temperature when the polymer seal (116) and the TWSMA member (122) were positioned in the seal recess (118). In the expanded shape (122E) the TWSMA member (122) exerts a force (130) on the polymer seal (116) so as to urge the polymer seal (116) into sealing contact with the second component (114) and wherein in the expanded shape (122E), at least a portion (122S1) of a surface (122S) of the TWSMA member (122) is positioned at a location that is farther away from a surface (118A, 118X) of the seal recess (118) that the portion (122S1) was when the TWSMA member (122) was in its retracted shape (122R).

21 Claims, 10 Drawing Sheets

(56) References Cited

U.S. PATENT DOCUMENTS

| | | | |
|---|---|---|---|
| 4,445,694 A | 5/1984 | Flaherty | |
| 4,469,357 A | 9/1984 | Martin | |
| 4,537,406 A * | 8/1985 | Hirasuna | E21B 17/0423 |
| | | | 277/314 |
| 4,832,382 A | 5/1989 | Kapgan | |
| 5,132,873 A | 7/1992 | Nelson et al. | |
| 5,366,254 A | 11/1994 | Tucchio et al. | |
| 5,368,312 A | 11/1994 | Voit et al. | |
| 6,012,025 A | 2/2000 | St. Amand | |
| 6,019,025 A * | 2/2000 | St. Amand | F41F 3/07 |
| | | | 89/1.817 |
| 6,546,602 B1 * | 4/2003 | Eipper | A44B 18/0003 |
| | | | 24/304 |
| 8,109,042 B2 | 2/2012 | McKnight et al. | |
| 8,505,925 B2 | 8/2013 | Gao et al. | |
| 8,602,419 B2 | 12/2013 | Namuduri et al. | |
| 8,800,648 B2 | 8/2014 | Kocurek et al. | |
| 2002/0113380 A1 | 8/2002 | Clark | |
| 2003/0057655 A1 * | 3/2003 | Chehab | F16J 15/008 |
| | | | 277/500 |
| 2004/0194970 A1 | 10/2004 | Eatwell et al. | |
| 2005/0012277 A1 * | 1/2005 | Adrion | F16J 15/164 |
| | | | 277/549 |
| 2005/0198904 A1 | 9/2005 | Browne et al. | |
| 2005/0212304 A1 | 9/2005 | Herrera et al. | |
| 2006/0220327 A1 * | 10/2006 | Russell | F16J 15/121 |
| | | | 277/611 |
| 2008/0079222 A1 | 4/2008 | Namuduri et al. | |
| 2014/0203516 A1 | 7/2014 | Kocurek et al. | |
| 2015/0083281 A1 * | 3/2015 | Lipkin | C22C 19/00 |
| | | | 148/563 |
| 2016/0068728 A1 | 3/2016 | Akulichev et al. | |

FOREIGN PATENT DOCUMENTS

| | | |
|---|---|---|
| JP | S61256066 A | 11/1986 |
| JP | H01153871 A | 6/1989 |

OTHER PUBLICATIONS

International Search Report and Written Opinion dated Feb. 3, 2017 for PCT/US2016/035645.

* cited by examiner

High Temperature

Low Temperature

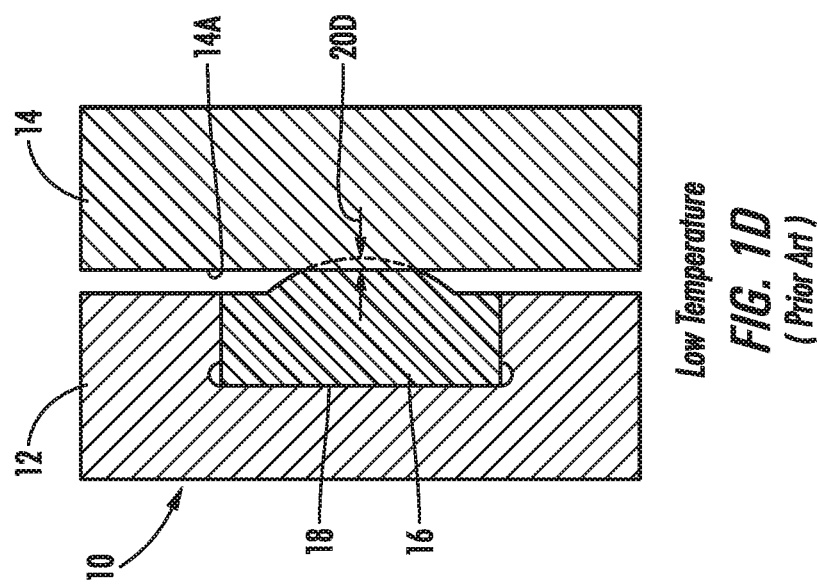
FIG. 1D (Prior Art) Low Temperature
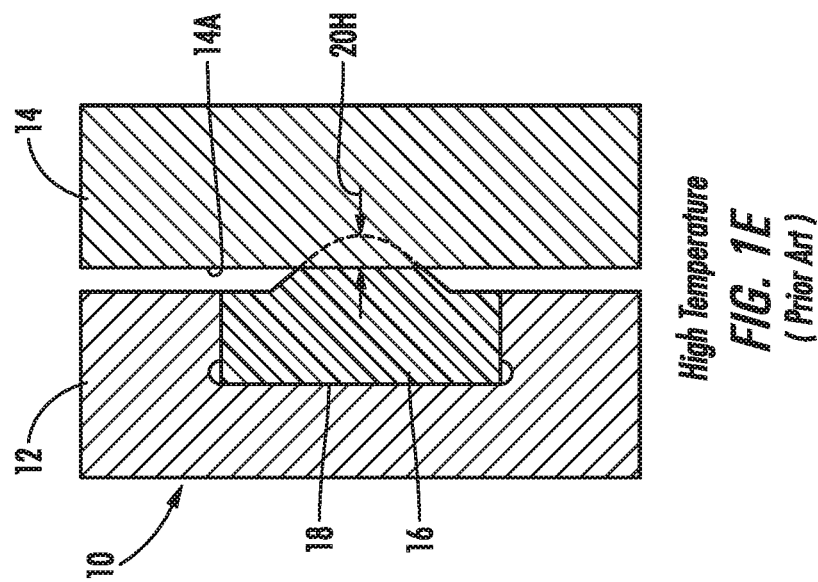
FIG. 1E (Prior Art) High Temperature

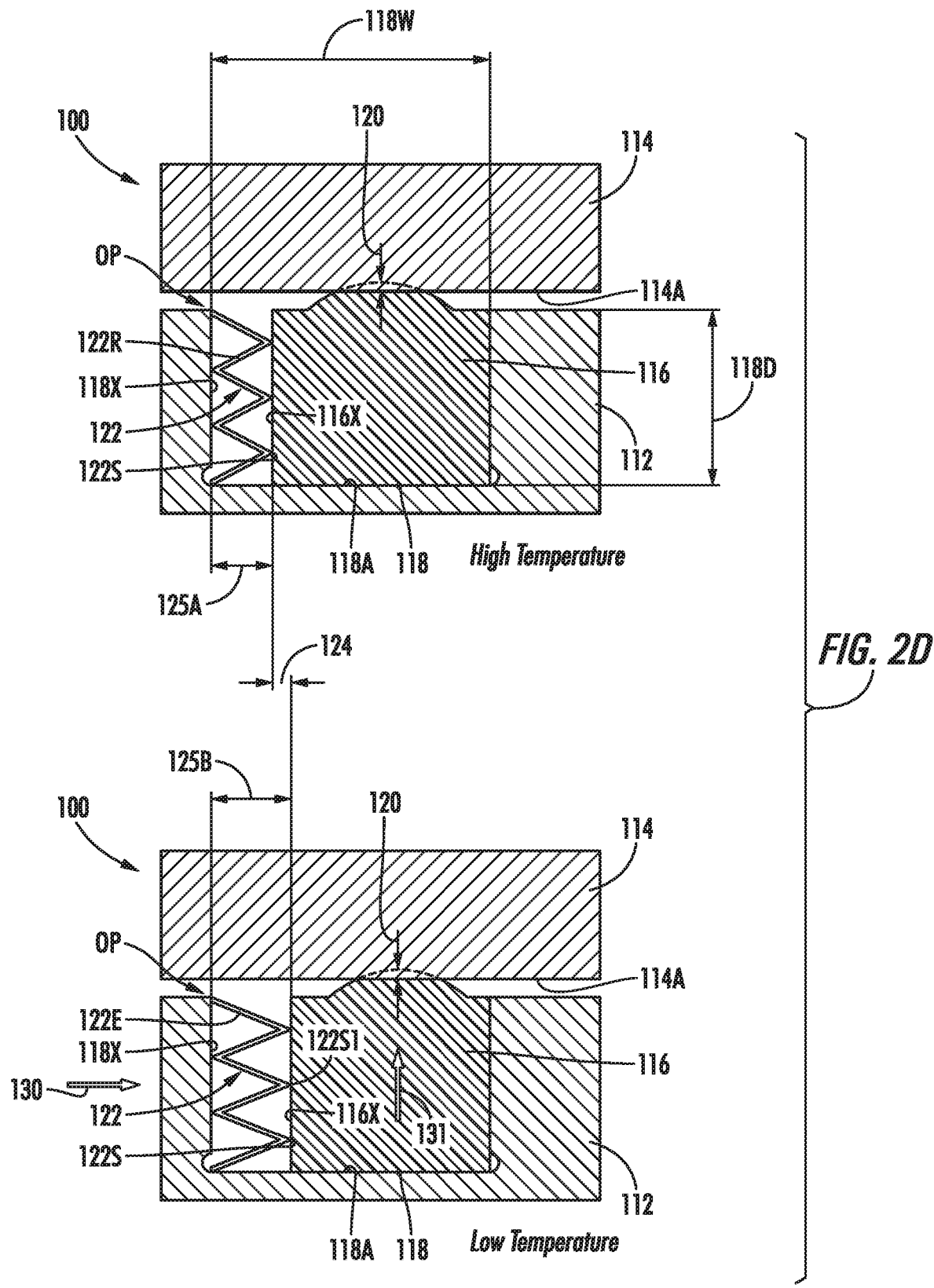

SHAPE MEMORY ALLOY MEMBER FOR USE IN POLYMER OR COMPOSITE SEAL APPLICATIONS

FIELD OF INVENTION

The present invention generally relates to polymer seals that may be used to provide a seal between two components that may be used in, for example, the oil and gas industry and, more particularly, to a unique shape memory alloy member for use in polymer seal applications.

BACKGROUND OF THE INVENTION

Polymer seals have been used for many years to establish a seal between two components. FIG. 1A is a simplistic depiction of a system 10 comprising a first component 12 and a second component 14 wherein a polymer seal 16 is used to establish a seal between the two components 12, 14. More specifically, the system 10 is designed such that, under the operating conditions of the system 10, a portion of the polymer seal 16 engages a sealing surface 14A on the second component 14. The seal 16 is positioned within a seal recess 18 defined in the first component 12. The first and second components 12, 14 may be stationary to one another during operation or one of the components, e.g., the component 14 may rotate or move relative to the component 12.

Such polymer seals 16 are being employed in an ever-increasing array of applications wherein the seal 16 has to perform its sealing function over a very wide range of temperatures. For example, in some subsea applications, such polymer seals 16 are designed to seal at a temperatures range that may be about −59-343° C. (−75-650° F.). This can be very challenging for the designer of the seal system 10. With reference to FIG. 1A, and in general, an polymer seal 16 is designed such that, under operating conditions, there is a proper amount of designed interference 20D between the seal 16 and the sealing face 14A so that a seal is established. Designing the proper amount of interference 20D takes into account several factors such as the thermal expansion of the components 12, 14 and the seal 16, the spacing between the two components 12, 14, anticipated pressure and temperature fluctuations, etc. Ultimately, the seal 16 must be designed such that if performs its sealing function over the entire design temperature range for the particular application.

This is becoming more problematic as the desired operating temperature ranges for such polymer 16 seals have increased. In general the usefulness of an polymer seal at low temperatures is dependent on whether the polymer material is at a temperature that is above its glass transition temperature ($T_g$), where it still behave elastically, or below its glass transition temperature ($T_g$), where the polymer material become relatively harder and relatively less flexible. High pressures are known to shift the glass transition temperature ($T_g$) of polymer materials which decreases the low temperature sealing performance of the polymer materials. Also, at cold temperatures, the polymer material tends to shrink more than adjacent metal materials due to thermal contraction which causes loss of sealing. In one illustrative application, the seal 16 is designed to operate at a temperature range of 205° C. (400° F.) (high temperature condition) to −18° C. (0° F.) (low temperature condition). As shown in FIG. 11B, if the system 10 is designed such that there is proper sealing interference 20D at the high temperature (205° C.) condition then, as shown in FIG. 1C, there may be insufficient sealing interference 20L at the low temperature (−18° C.) condition, i.e., the seal 16 may be under-squeezed a the low temperature condition, such that the seal 16 will not provide the necessary seal between the two components 12, 14. Conversely, as shown in FIG. 1D, if the system 10 is designed such that there is proper sealing 20D at the low temperature (−18° C.) condition, then, as shown in FIG. 1E, when the seal 16 expands under high temperature (205° C.) conditions, the amount of interference 20H between the seal 16 and the sealing face 14A may be too great, i.e., the seal 16 may be over-squeezed, thereby leading to permanent (non-recoverable) deformation of the polymer seal 16 which results in overall failure of the seal system 10.

The present application is directed to a sealing system comprising a unique shape memory alloy member for use in polymer seal applications that may eliminate or at least minimize some of the problems noted above.

BRIEF DESCRIPTION OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present application is generally directed to a unique shape memory alloy member for use in polymer seal applications. In one example, the sealing system includes a first component, a second component and a polymer seal positioned in a seal recess in the first component. A two way shape memory (TWSMA) member is positioned in the seal recess, wherein the TWSMA member has a retracted shape and an expanded shape, the TWSMA member transitioning from the retracted shape to the expanded shape at a temperature that is less than an installation temperature when the polymer seal and the TWSMA member were positioned in the seal recess. In the expanded shape the TWSMA member exerts a force on the polymer seal so as to urge the polymer seal into sealing contact with the second component and wherein in the expanded shape, at least a portion of a surface of the TWSMA member is positioned at a location that is farther away from a surface of the seal recess that the portion was when the TWSMA member was in its retracted shape.

BRIEF DESCRIPTION OF THE DRAWINGS

The present invention will be described with the accompanying drawings, which represent a schematic but not limiting its scope:

FIGS. 1A-1E are various views of an illustrative prior art polymer seal that is used to establish a seal between two components; and FIGS. 2A-2H are cross-sectional views of various illustrative embodiments of a unique shape memory alloy member disclosed herein for use in polymer seal applications.

Figure 1A:
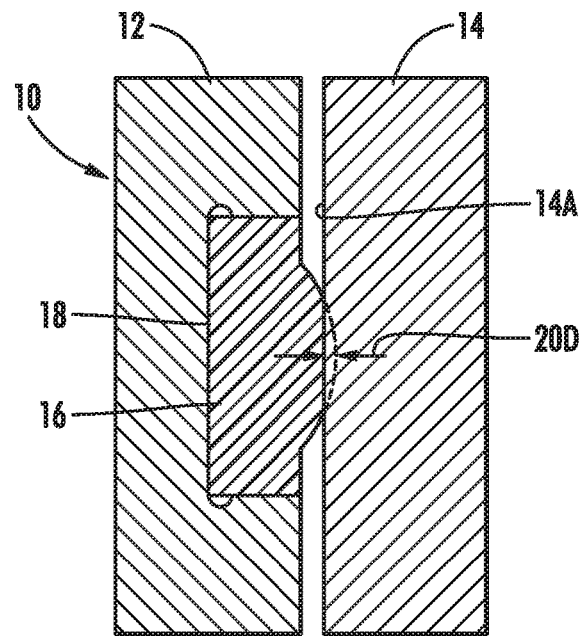
Figure 1B:
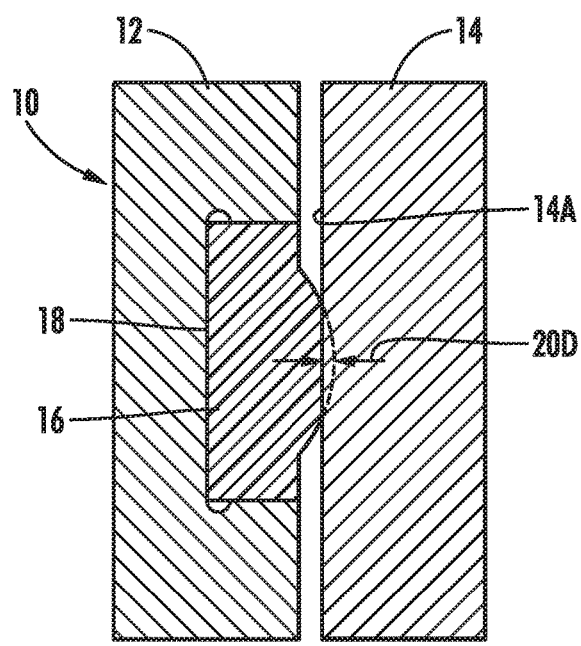
Figure 1C:
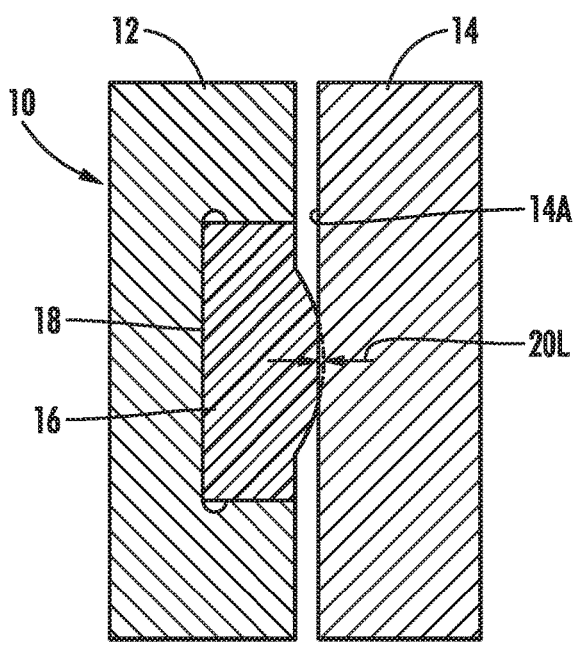

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with valve-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, valves and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2A:
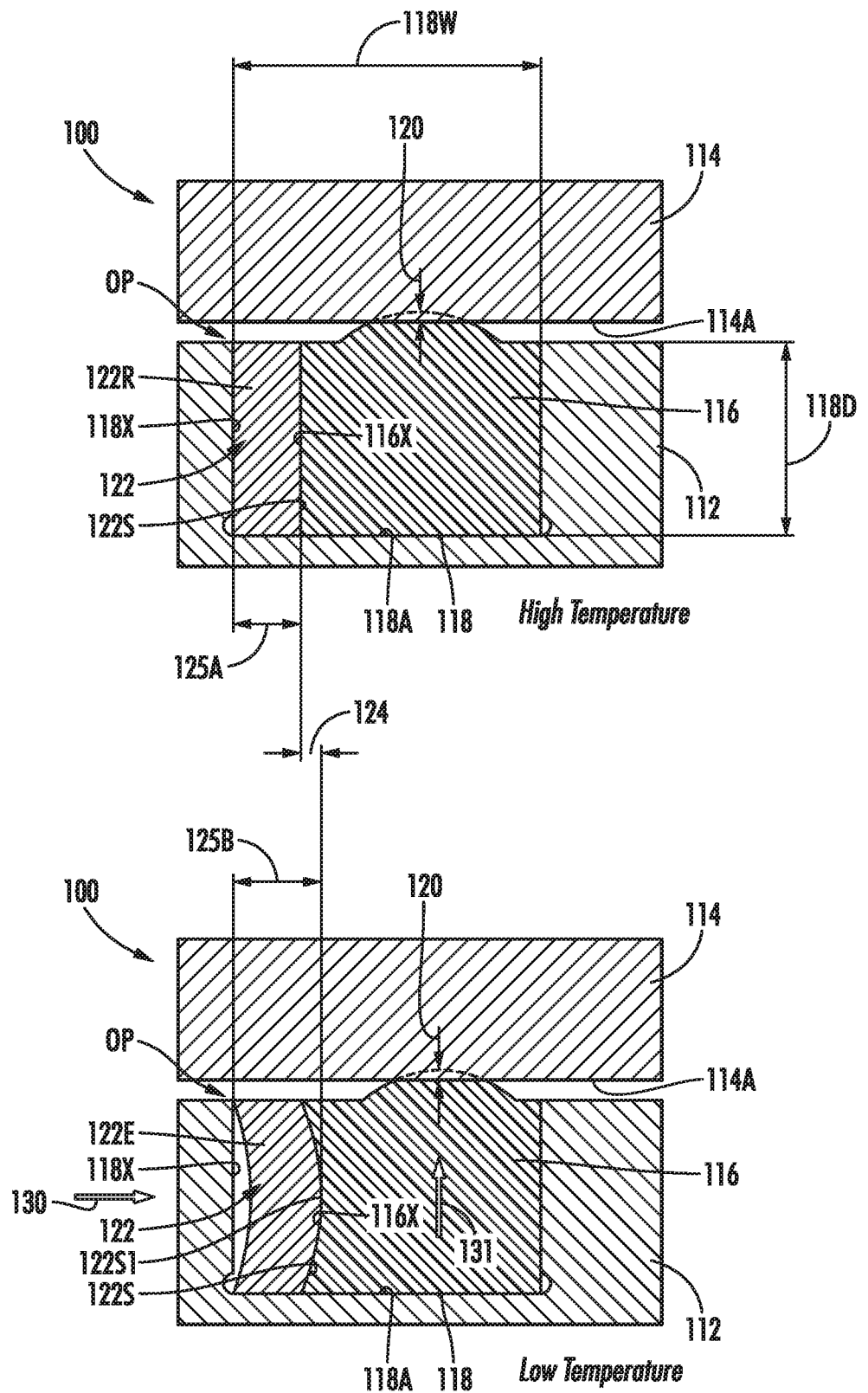
Figure 2B:
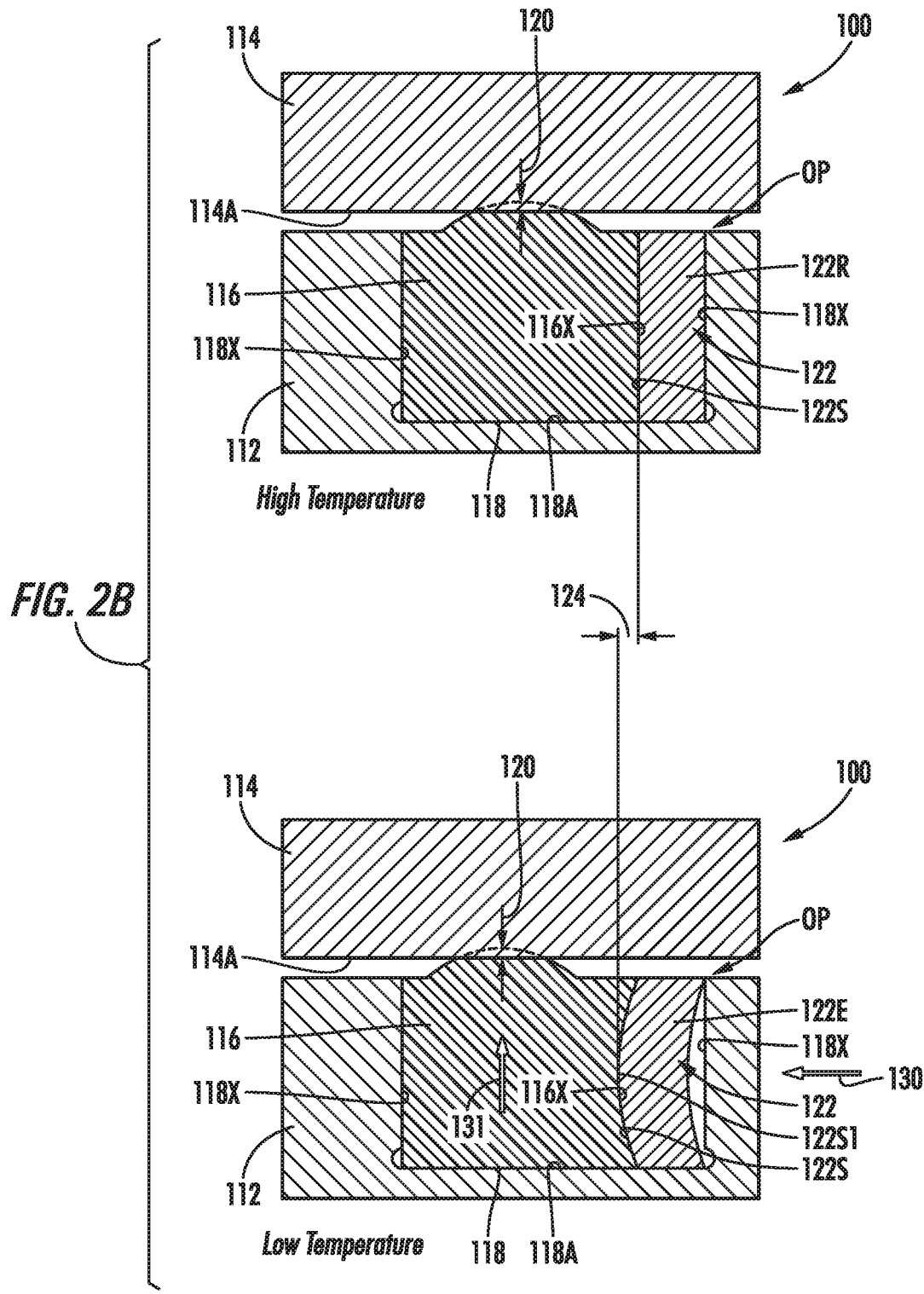

Illustrative examples of a novel and unique system 100 that includes a novel and unique two-way shape memory alloy member 122 (TWSMA member 122) for use in polymer seal applications will now be described with reference to the attached drawings. FIG. 2A contains simplistic cross-sectional depictions of a system 100 comprising a first component 112 and a second component 114 wherein a polymer seal 116 is used to establish a seal between the two components 112, 114. The seal system 100 is designed to operate over a range of operating or design temperatures. For example, in one illustrative embodiment, the seal system 100 may be designed to operate over a temperature range of −59-343° C. (−75-650° F.). Of course, this illustrative design temperature range is provided by way of example only and the high and low temperatures of such a design temperature range may change depending upon the particular application. In general, the term "high temperature condition" will be used to refer to the temperature at or near the upper end of any such temperature range while the term "low temperature condition" will be used to refer to a temperature at or near the lower end of any such temperature range. In many of the drawings, the upper figure in the drawings depicts the system 100 under high temperature conditions ("High Temp") while the lower figure depicts the system under low temperature ("Low Temp") conditions. FIGS. 2A-2B and 2D-2G depicts embodiments wherein the TWSMA member 122 and the seal 116 are arranged in a general side-by-side configuration within a seal recess 18. The side-by-side arrangement may be employed in applications where, for example, the second component 114 represent a rotating shaft and the first component 112 represent a housing wherein the seal 116 is adapted to provide a seal against the internal operating pressure ("OP") within the system 100. In the embodiment shown in FIG. 2A the TWSMA member 122 is positioned upstream of the point where the seal 116 engages the sealing face 114A, i.e., the TWSMA member 122 is exposed to the operating pressure of the system. In the embodiment shown in FIG. 2B, the TWSMA member 122 is positioned downstream of the point where the seal 116 engages the sealing face 114A, i.e., the TWSMA member 122 is not exposed to the operating pressure of the system.

With continuing reference to FIG. 2A, the seal recess 118 is defined in the first component 112. In the depicted example, the seal has a bottom surface 118A and a plurality of side surfaces 118X. A simplistically depicted polymer seal 116 and the TWSMA member 122 (that will generally be referenced using the number 122) are positioned within the seal recess 118. The system 100 is designed such that, throughout the entire design operating temperature range for the system 100, a portion of the polymer seal 116 engages a sealing surface 114A on the second component 114 to thereby establish an effective seal between the two components 112, 114. As depicted in the upper drawing in FIG. 2A, under high temperature conditions, the TWSMA member 122 is in its retracted or collapsed shape or state 122R, while in the lower drawing, under low temperature operating conditions, the TWSMA member 122 is in its expanded shape or size 122E. Note that the seal recess 118 has an initial volume that may be approximately defined by multiplying the width (118W) of the seal recess 118 times the depth (118D) of the seal recess 118 times the outer circumference of the seal recess 118 (or the circumference at mid-depth of the seal recess 118). In the example depicted in FIG. 2A, the TWSMA member 122 takes the form of a cylinder of material, such as for use in an open gland, face seal or stem seal applications. In closed gland applications, the TWSMA member 122 may be in the form of a splint ring or a plurality of ring segments. As depicted, when the TWSMA member 122 is in its retracted or collapsed shape or state 122R it occupies a smaller volume (as reflected by the smaller cross-sectional area 125A occupied by the TWSMA member 122) of the overall volume of the seal recess 118 that it does when it is in its expanded shape or size 122E and occupies a larger volume (as reflected by the larger cross-sectional area 125B occupied by the TWSMA member 122) of the seal recess 118. That is, using the novel TWSMA member 122 disclosed herein, the effective size of the seal recess 118 may be decreased under low temperature conditions such that the TWSMA member 122, when it is in its expanded shape or state 122E, exerts a force 130, e.g., a squeezing force, on the polymer seal 116 so as to urge the polymer seal 116 to move in a direction indicated by the arrow 131 so as to force the seal 116 into contact with the sealing surface 114A of the second component 114.

In the example depicted in FIG. 2A, when the TWSMA member 122 is in at least its expanded state 122E at least a portion 122S1 of a surface 122S of the TWSMA member 122 contacts a side surface 116X of the polymer seal 116. In other applications, at least a portion of the surface 122S of the TWSMA member 122 may contact the side surface 116X of the polymer seal 116 when the shape memory alloy member is in its retracted state 122R as well. In this particular example, the polymer seal 116 is positioned between the TWSMA member 122 and the sealing surface 114A of the second component 114 and the force 130 exerted on the polymer seal 116 is in a direction that is substantially parallel to the sealing surface 114A of the second component 114. Also note that at least a portion 122S1 of the surface 122S of the TWSMA member 122 is positioned farther away from the side surface 118X of the seal recess 118, as reflected by the distance 124, when the in its expanded state or size 122E (lower drawing) that the portion 122S1 was when the TWSMA member 122 was in its retracted or collapsed shape or state 122R (upper drawing). The magnitude of this distance 124 may vary depending upon the particular application. Also note that, in some applications, the TWSMA member 122, in either its expanded state 122E, its retracted state 122R and/or both states may contact either or all of the surfaces 118A, 118X of the seal recess 118. In one illustrative embodiment, the volume of the seal recess 118 occupied by the TWSMA member 122 can be varied by about 20% between high and low temperature conditions.

With reference to the various embodiments disclosed herein, the seal recess 118 may be of any desired size, shape or configuration. In the example depicted in FIG. 2A, the seal recess 118 takes the form of a groove that is cut into the first component 112 and extends around the entire perimeter of the first component 112. The polymer seal 116 is also illustrative in nature is that it is intended to be representative of any type of seal made of a polymer material. As used herein and in that attached claims, the term "polymer" shall be understood to mean materials such as natural or synthetic rubber, amorphous polymers whose molecules form an entangled network (characterized by randomness and lack of long-range structure), silicone, fluorosilicone, hydrogenated nitrile (HNBR), fluorocarbon (FKM), perfluorolastomer (FFKM), AFL (tetrafluoroethylene propylene), ethylene Propylene (EPDM), filled or unfilled PTFE (polytetrafluoroethylene), or a seal material that is qualified API 6A PR2 (Annex F) requirements. Of course, as will be appreciated by those skilled in the art after a complete reading of this application, the polymer seal 116 may be of any desired shape or form and the amount or portion of the seal 116 that contacts the sealing surface 114A of the second component 114 may vary depending upon the particular application. Additionally, the seal 116 may contain other components such as an anti-extrusion ring (not shown) embedded within the polymer seal 116.

Figure 2C:
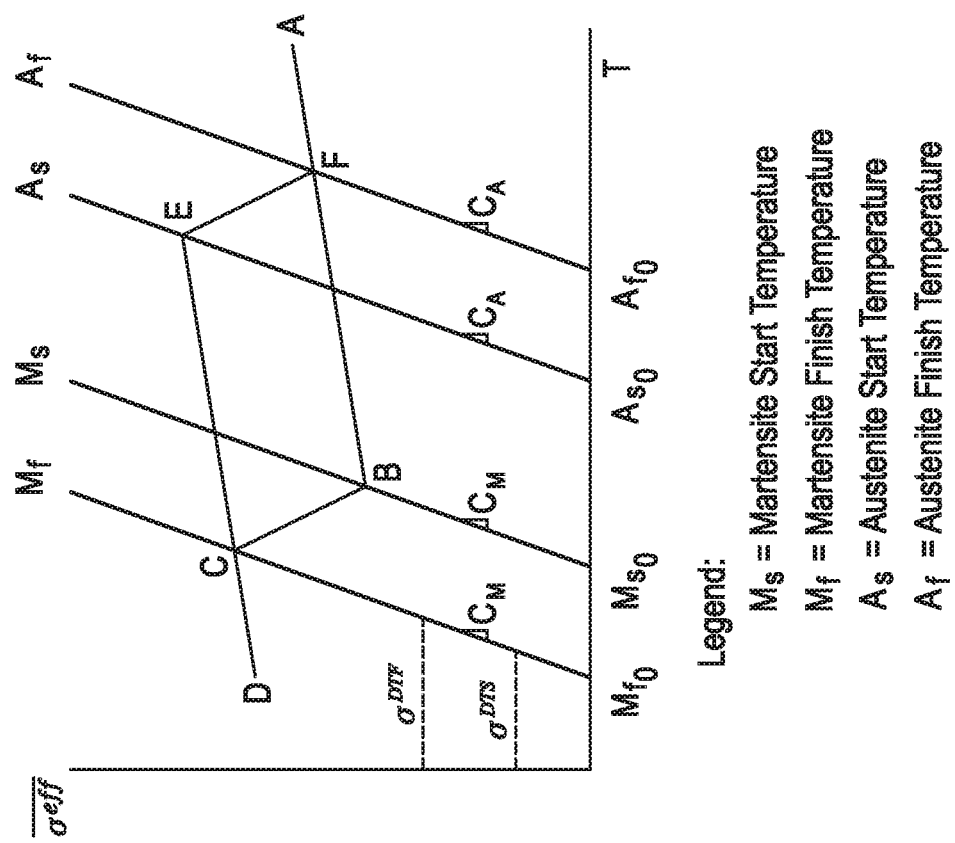

FIG. 2C is a chart that will be used to describe some operational characteristics of one illustrative embodiment of the TWSMA member 122 disclosed herein. The horizontal axis in FIG. 2C is the temperature of the TWSMA member 122, while the vertical axis reflects the nominal stress on the TWSMA member 122. In one illustrative embodiment, the TWSMA member 122 is a comprised of a two-way shape memory alloy material wherein it transitions between its retracted or collapsed shape or state 122R and its expanded state or size 122E depending upon the temperature to which the TWSMA member 122 is exposed. The TWSMA member 122 may be made of a variety of materials. In one illustrative embodiment, the TWSMA member 122 may be comprised nickel and titanium, and in one particular embodiment the TWSMA member 122 comprises 49.9% nickel and 50.1% titanium ($Ni_{49.9}Ti_{50.1}$). When the TWSMA member 122 is comprised of a material such as $Ni_{49.9}Ti_{50.1}$, the TWSMA member 122 may be "trained" by applying a constant stress and cycling the temperature for many cycles, e.g., 100 cycles, of complete phase transformation between its retracted or collapsed shape or state 122R and its expanded state or size 122E. In the example where the TWSMA member 122 is comprised of $Ni_{49.9}Ti_{50.1}$, the TWSMA member 122 alloy can apply an expansion strain of about 2% against a compressive stress of about 25 MPa (3.7 ksi), or an extension of about 1.25% against a compressive stress of about 50 MPa (7.4 ksi).

In general, the TWSMA member 122 disclosed herein transforms from austenite (its structure when it is in its retracted or collapsed shape or state 122R) to martensite (its structure when it is in its expanded shape or size 122E) upon cooling. With reference to FIG. 2C, in one illustrative embodiment, where the TWSMA member 122 is comprised of $Ni_{49.9}Ti_{50.1}$, the TWSMA member 122 is designed such that it is in its retracted or collapsed shape or state 122R (e.g., austenite) at or near the installation temperature ($T_1$) that is anticipated at the time when the TWSMA member 122 is installed in the seal recess 118 along with the polymer seal 116. In one illustrative embodiment, for most applications, the installation temperature ($T_1$) will fall within the normal room temperature range in different regions of the world, i.e., a range of about 15-38° C. (60-100° F.) (inclusive of endpoints) and the installation temperature ($T_1$) will be above the martensite start transformation temperature ($M_s$)—the temperature where the TWSMA member 122 starts its transformation from ausentite (its structure when it is in its retracted or collapsed shape or state 122R) to martensite (its structure when it is in its expanded state 122E at the completion of its transformation to martensite). In one illustrative embodiment, the material of the TWSMA member 122 is designed such that its martensite start transformation temperature ($M_s$) is less than the lowest anticipated installation temperature ($T_i$). For low temperature performance, the martensite start transformation temperature ($M_s$) has to be higher than the transition temperature ($T_g$) of the polymer. As shown in FIG. 2C, in one illustrative embodiment, wherein the shape memory material for the TWSMA member 122 is $Ni_{499}Ti_{501}$, the martensite start transformation temperature ($M_s$) may be about 12.8° C. (55° F.); the martensite finish transformation temperature ($M_f$) may be about −1° C. (30° F.); the austenite start transformation temperature ($A_s$) may be about 27.8° C. (82° F.); and the austenite finish transformation temperature ($A_f$) may be about 42.8° C. (109° F.). Thus, with reference to FIG. 2C, during cooling, the TWSMA member 122 starts changing from austenite to martensite at point B and completes its transformation to martensite at point C (wherein it is in its fully expanded shape or state 122E). Similarly, during heating, the TWSMA member 122 starts its transformation from martensite to austenite at point E and completes its transformation to austenite at point F (wherein it is in its collapsed or retracted state 122R).

With continuing reference to FIG. 2C, from point A to B, the TWSMA member 122 is in its collapsed state 122R and substantially all austenite. During installation, the TWSMA member 122 will remain in this collapsed state 122R and may be positioned in contact with the polymer seal 116 (or the additional member 132 or a portion of a surface 118A, 118X that defines a portion of the seal recess 118). Once the system 100 is placed in service, as long as the TWSMA member 122 is at a temperature that is above the martensite start transformation temperature ($M_s$), the TWSMA member 122 will remain in its retracted or collapsed shape or state 122R, and the seal 116 may be designed so as to have a proper amount of interference 120 with the sealing surface 114A over this range of temperature, i.e., the range from the martensite start transformation temperature ($M_s$) up through the maximum design temperature for the seal 116. However, once the temperature of the TWSMA member 122 is reduced to a point where it equals the martensite start transformation temperature ($M_s$) at point B, the TWSMA member 122 begins its transformation from austenite to martensite. The transformation continues from point B to C, wherein at point C, the TWSMA member 122 is substantially all martensite and in its expanded state or size 122E. That is, while the cooling of the operating temperature of the system 100 will cause the polymer seal 116 to contract, once the temperature of the TWSMA member 122 is cooled to its final transformation temperature (from point B to point C), the TWSMA member 122 will expand to compensate for the contraction of the seal 116, thereby insuring that a proper seal interference 120 is maintained even at the lower end of the overall design temperature range for the seal 116. As indicated, from point C to D, further cooling of the TWSMA member 122 will reduce the pressure on the TWSMA member 122, but it will still remain as substantially all martensite.

Upon heating of the system 100 along the path or point D to point E, the pressure on the TWSMA member 122 increases due to the expansion of the polymer seal 116, but the TWSMA member 122 will still remain as substantially all martensite and thus still in its expanded state 122E. However, once the temperature of the TWSMA member 122 is increased to a point where it equals the austenite start transformation temperature ($A_s$) at point E, the TWSMA member 122 begins its transformation from martensite to austenite. The transformation continues from point E to F, wherein at point F, the TWSMA member 122 is substantially all austenite and it is in its retracted state or size 122R. Thus, as the polymer seal 116 expands due to increasing operating temperature, the TWSMA member 122 transforms to it retracted or collapsed shape or state 122R whereby it occupies less volume of the seal recess 118 and the seal 116 may be designed so as to have a proper amount of interference 120 with the sealing surface 114A at temperatures above the austenite finish temperature ($A_f$) without fear of providing too large of interference 120 between the seal 116 and the sealing face 114A so as to result in undesirable permanent deformation of the polymer seal 116.

Figure 2E:
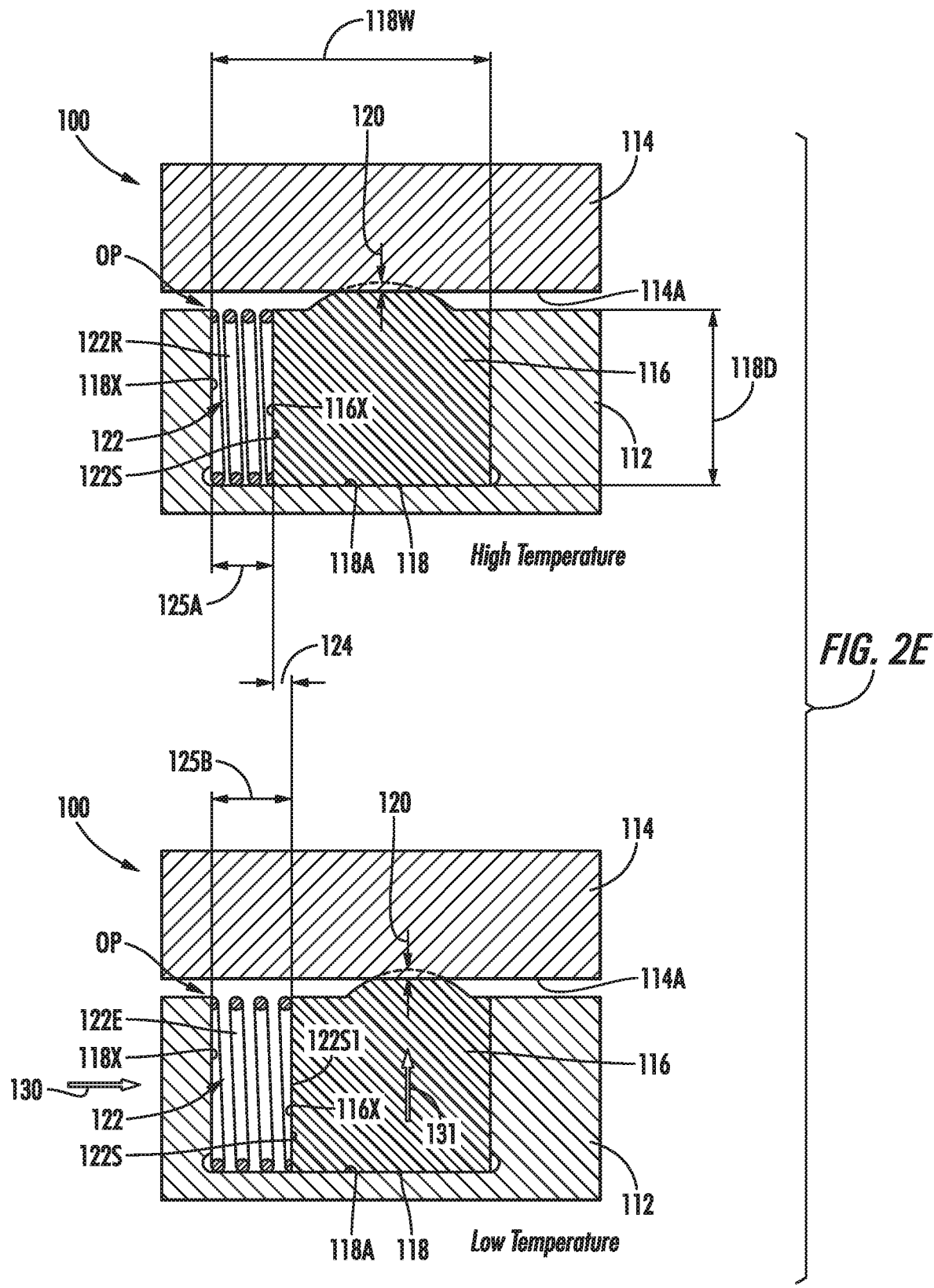
Figure 2F:
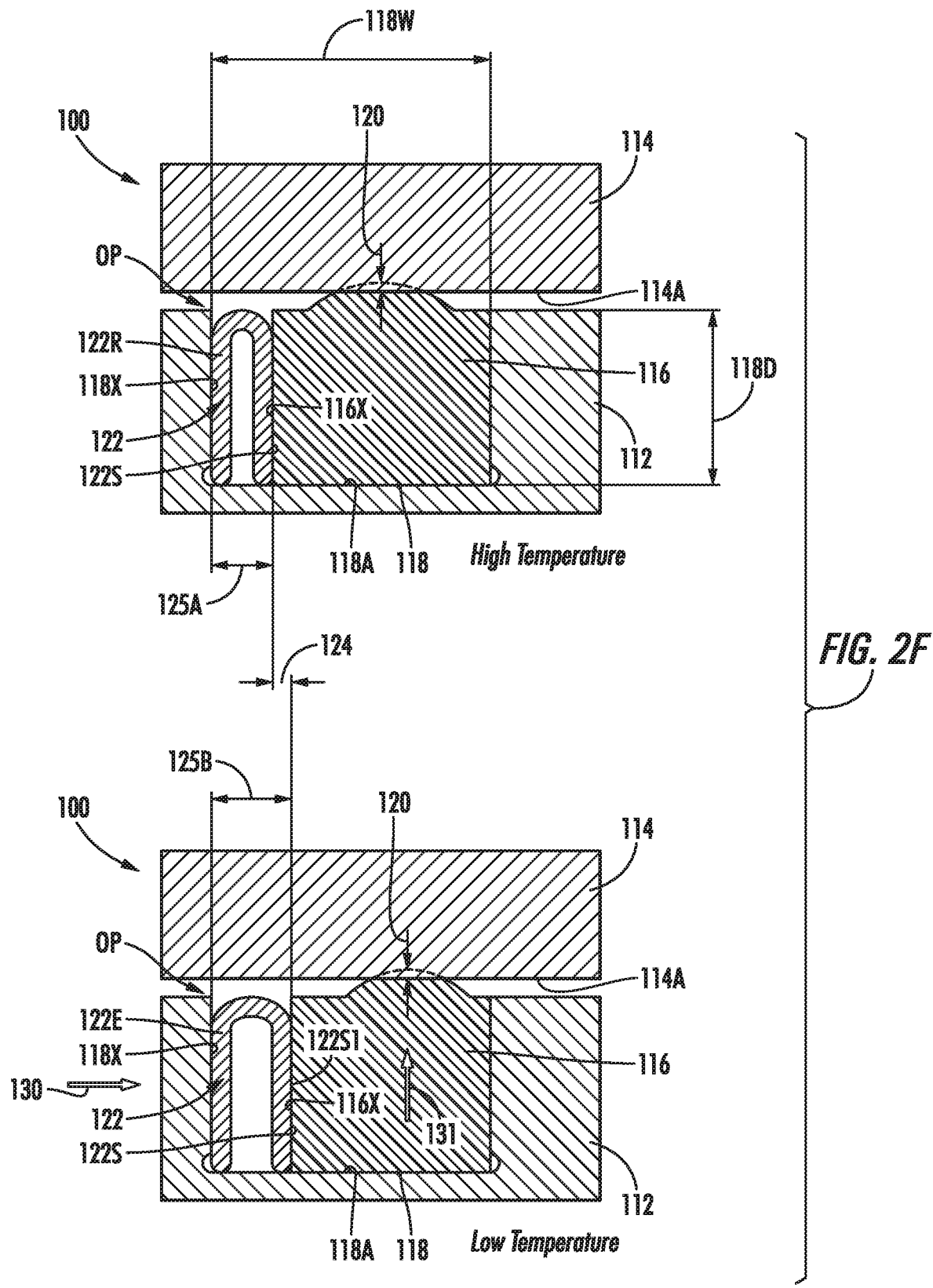

After a complete reading of the present application, those skilled in the art will appreciate that the TWSMA member 122 disclosed herein may come in a variety of different forms and configurations. For example, FIG. 2D depicts an embodiment wherein the TWSMA member 122 takes the form of a simplistically depicted wave spring. FIG. 2E depicts an embodiment wherein the TWSMA member 122 takes the form of a simplistically depicted coiled spring. FIG. 2F depicts an embodiment wherein the TWSMA member 122 takes the form of a simplistically U-shaped spring. Of course, in some application, the shape and configuration of the seal recess 118 and/or the seal 116 may need to be modified to accommodate different sizes, shapes and forms of the TWSMA member 122.

Figure 2G:
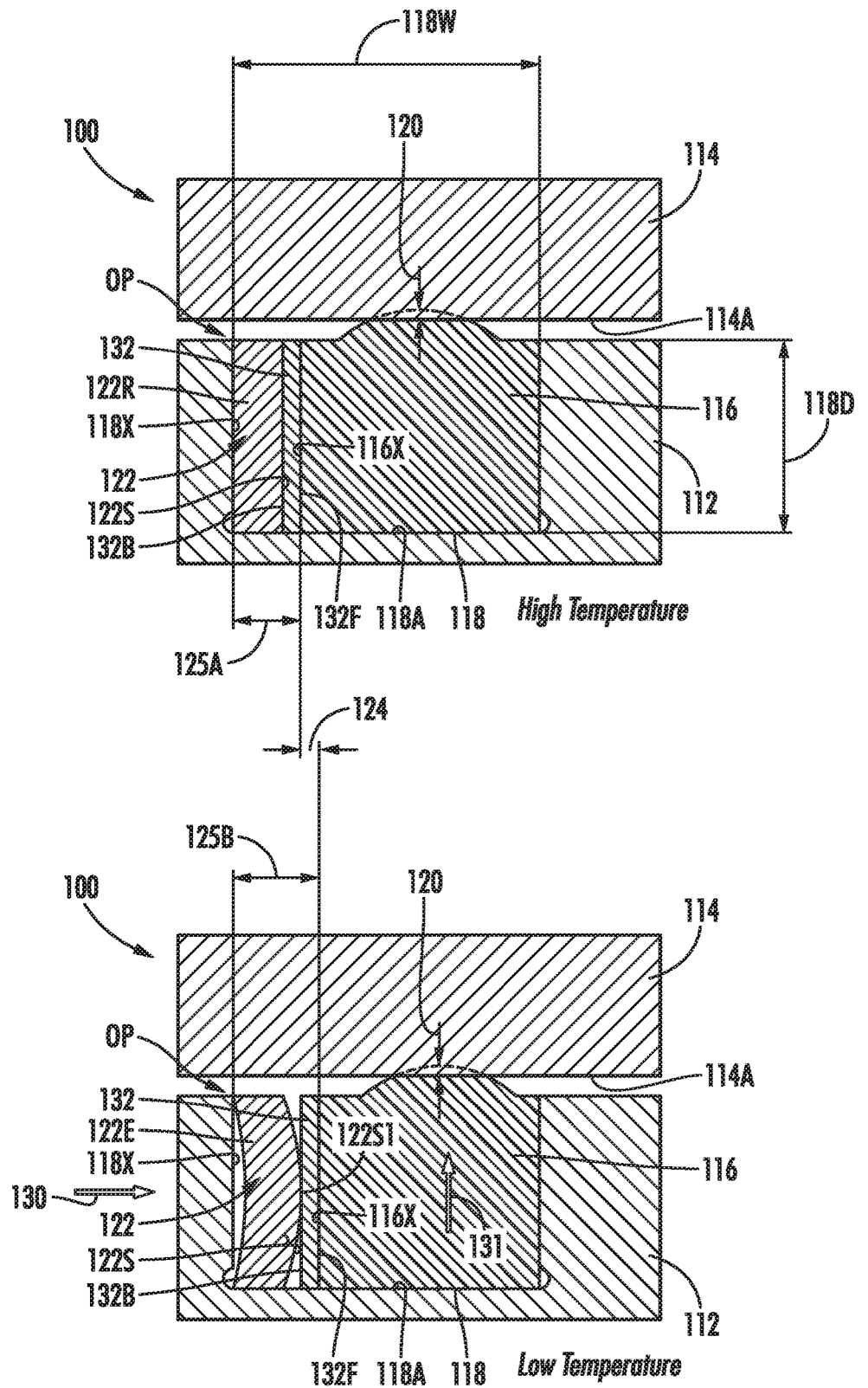

FIG. 2G depicts an embodiment of the system 100 wherein at least one additional member 132 is positioned within the seal recess 132 between the TWSMA member 122 and the polymer seal 116. In the depicted example, the additional member 132 may be a relatively rigid material, such as a metal or metal alloy. In the depicted example, the additional member 132 has a substantially planar front surface 132F and a substantially planar back surface 132B. In one embodiment, the front surface 132F is adapted to engage at least a portion of the surface 116A of the polymer seal 116 at least when the TWSMA member 122 in its expanded state or size 122E and at least a portion 122S1 of the surface 122S of the TWSMA member 122 is adapted to engage at least a portion of the substantially planar back surface 132B at least when the TWSMA member 122 in its expanded state or size 122E. Of course, as well be appreciated by those skilled in the art after a complete reading of the present application, any desired number of such additional members 132 may be positioned within the seal recess 118. Additionally, even though in the embodiment depicted in FIG. 2G the TWSMA member 122 does not directly contact the polymer seal 116 due to the presence of the additional member 132, in its expanded state or size 122E the TWSMA member 122 still exerts the above-described squeezing force 130 on the polymer seal 116. That is, in its expanded state or size 122E, the novel and unique the TWSMA member 122 may be used to generate the above described force 130 on the polymer seal 116 directly (by way of direct contact between the TWSMA member 122 in its expanded state or size 122E and the seal 116) or indirectly (by way of direct contact between the TWSMA member 122 in its expanded state or size 122E and at least one additional member 132 wherein the force 130 generated by the TWSMA member 122 in its expanded state or size 122E is indirectly transmitted to the seal 116 via the additional member 132.

Figure 2H:
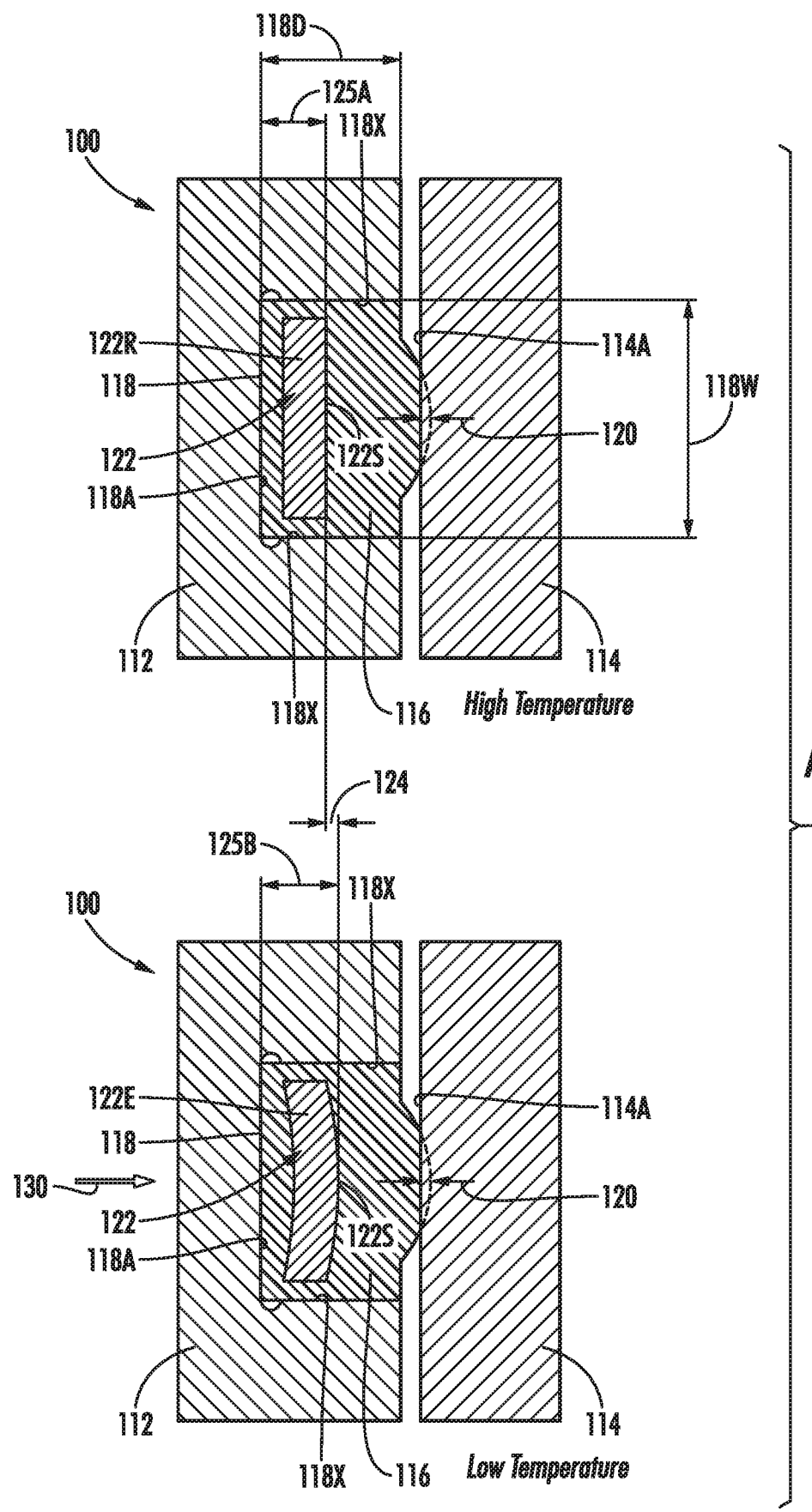

FIG. 2H depicts embodiments wherein the TWSMA member 122 and the seal 116 are arranged in a radial configuration within the seal recess 18 and wherein the TWSMA member 122 is embedded within the seal 116. In this example, the above-described force 130 generated when the TWSMA member 122 is in its expanded state is substantially normal to the sealing surface 114A of the second component 114. The TWSMA member 122 may be of any desired shape or form when it is embedded within the seal 116, i.e., it can take the form of the above-depicted wave spring, coiled spring or U-shaped member.

As will be appreciated by those skilled in the art after a complete reading of the present application, no attempt has been made to depict any deformation and/or movement of the TWSMA member 122, the seal 116 and/or the additional member 132 due to internal operating pressure within the system 100. The deformations of the TWSMA member 122 depicted herein as solely the result of the properties of the material of the TWSMA member 122 and the temperatures to which it is exposed.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The invention claimed is:

1. A sealing system, comprising:
   a first component comprising a seal recess defined in the first component, the seal recess having a surface;
   a second component comprising a sealing surface;

a polymer seal positioned in the seal recess; and a two way shape memory alloy (TWSMA) member positioned in the seal recess at an installation temperature, the TWSMA member comprising a first surface and a second surface, the first surface of the TWSMA member being positioned closer to the polymer seal than the second surface, the TWSMA member having a retracted shape and an expanded shape, the TWSMA member being adapted to transition from the retracted shape to the expanded shape at a temperature that is less than the installation temperature, wherein in the expanded shape the TWSMA member exerts a force on the polymer seal in a direction that is substantially parallel to the sealing surface of the second component so as to urge the polymer seal into contact with the sealing surface of the second component and wherein, in the retracted shape, a portion of the first surface of the TWSMA member is positioned a first distance from the surface of the seal recess and, in the expanded shape, the portion of the first surface of the TWSMA member is positioned a second distance from the surface of the seal recess, the second distance being greater than the first distance.

2. The system of claim 1, wherein in the expanded shape, the portion of the first surface of the TWSMA member contacts a surface of the polymer seal.

3. The system of claim 1, wherein the surface of the recess is a side surface and wherein, in the expanded shape, a portion of the second surface of the TWSMA member contacts the side surface of the recess.

4. The system of claim 1, wherein the TWSMA member is embedded within the polymer seal.

5. The system of claim 1, wherein the polymer seal is positioned between the TWSMA member and the sealing surface.

6. The system of claim 1, wherein the polymer seal and the TWSMA member are positioned within the seal recess in a side-by-side configuration.

7. The system of claim 1, wherein the TWSMA member is in the form of one of a cylinder, a wave spring, a coiled spring or a U-shaped spring.

8. The system of claim 1, wherein the TWSMA member transitions from the retracted shape to the expanded shape at a temperature that is less than 15° C. (60° F.).

9. The system of claim 1, wherein the TWSMA member comprises nickel and titanium.

10. The system of claim 9, wherein the TWSMA member comprises 49.9 percent nickel and 50.1 percent titanium ($Ni_{49.9}Ti_{50.1}$).

11. The system of claim 1, wherein the TWSMA member is comprised of a material having:
a martensite start transformation temperature ($M_s$) of about 12.8° C. (55° F.);
a martensite finish transformation temperature ($M_f$) of about −1° C. (30° F.);
an austenite start transformation temperature ($A_s$) of about 27.8° C. (82° F.); and
an austenite finish transformation temperature ($A_f$) of about 42.8° C. (109° F.).

12. The system of claim 1, wherein the TWSMA member is comprised of a material having a martensite start transformation temperature ($M_s$) that is less than a lowest anticipated installation temperature when the TWSMA member is positioned within the seal recess.

13. The system of claim 1, wherein, in the retracted shape, the first surface of the TWSMA member is a substantially planar surface and, in the expanded shape, the first surface of the TWSMA member is an arcuate surface.

14. A sealing system, comprising:
a first component comprising a seal recess defined in the first component, the seal recess having a surface;
a second component comprising a sealing surface;
a polymer seal positioned in the seal recess; and
a two way shape memory alloy (TWSMA) member positioned in the seal recess at an installation temperature, the TWSMA member comprising a first surface and a second surface, the first surface of the TWSMA member being positioned closer to the polymer seal than the second surface, the TWSMA member having a retracted shape and an expanded shape, the TWSMA member being adapted to transition from the retracted shape to the expanded shape at a temperature that is less than the installation temperature, wherein in the expanded shape the TWSMA member exerts a force on the polymer seal in a direction that is substantially parallel to the sealing surface of the second component so as to urge the polymer seal into contact with the sealing surface of the second component, and wherein, in the retracted shape, a portion of the first surface of the TWSMA member is positioned a first distance from the surface of the seal recess and, in the expanded shape, the portion of the first surface of the TWSMA member contacts a side surface of the polymer seal and is positioned a second distance from the surface of the seal recess, the second distance being greater than the first distance.

15. The system of claim 14, wherein the TWSMA member transitions from the retracted shape to the expanded shape at a temperature that is less than 15° C. (60° F.).

16. The system of claim 14, wherein the TWSMA member is comprised of a material having:
a martensite start transformation temperature ($M_s$) of about 12.8° C. (55° F.);
a martensite finish transformation temperature ($M_f$) of about −1° C. (30° F.);
an austenite start transformation temperature ($A_s$) of about 27.8° C. (82° F.); and
an austenite finish transformation temperature ($A_f$) of about 42.8° C. (109° F.).

17. A sealing system, comprising:
a first component comprising a seal recess defined in the first component, the seal recess having a surface;
a second component comprising a sealing surface;
a polymer seal positioned in the seal recess;
a two way shape memory alloy (TWSMA) member positioned in the seal recess at an installation temperature, the TWSMA member comprising a first surface and a second surface, the first surface of the TWSMA member being positioned closer to the polymer seal than the second surface, the TWSMA member having a retracted shape and an expanded shape, the TWSMA member being adapted to transition from the retracted shape to the expanded shape at a temperature that is less than the installation temperature, wherein in the expanded shape the TWSMA member exerts a force on the polymer seal in a direction that is substantially parallel to the sealing surface of the second component so as to urge the polymer seal into contact with the sealing surface of the second component, and wherein, in the retracted shape, a portion of the first surface of the TWSMA member is positioned a first distance from the surface of the seal recess and, in the expanded shape, the portion of the first surface of the TWSMA member is positioned a second distance from the surface of the seal recess, the second distance being greater than the first distance; and a second member positioned within the seal recess between the TWSMA member and the polymer seal.

18. The system of claim 17, wherein in the expanded shape, the portion of the first surface of the TWSMA member contacts a first surface of the second member and a second surface of the second member contacts a surface of the polymer seal.

19. The system of claim 18, wherein the first and second surfaces of the second member are substantially planar surfaces.

20. The system of claim 17, wherein the TWSMA member transitions from the retracted shape to the expanded shape at a temperature that is less than 15° C. (60° F.).

21. The system of claim 17, wherein the TWSMA member is comprised of a material having:
- a martensite start transformation temperature ($M_s$) of about 12.8° C. (55° F.);
- a martensite finish transformation temperature ($M_f$) of about −1° C. (30° F.);
- an austenite start transformation temperature ($A_s$) of about 27.8° C. (82° F.); and
- an austenite finish transformation temperature ($A_f$) of about 42.8° C. (109° F.).

* * * * *